(12) United States Patent
Hsu et al.

(10) Patent No.: US 11,733,911 B2
(45) Date of Patent: Aug. 22, 2023

(54) STORAGE DEVICE AND STORAGE DEVICE MANAGEMENT METHOD

(71) Applicants: Hsiu-En Hsu, Taipei (TW); Chung-Chieh Lee, Taipei (TW); Jeng-Nan Lin, Taipei (TW); Chan-Ju Lin, Taipei (TW); Jie-Ting Hsieh, Taipei (TW); Tsuan-Fang Lin, Taipei (TW); Yi-Ting Lyu, Taipei (TW)

(72) Inventors: Hsiu-En Hsu, Taipei (TW); Chung-Chieh Lee, Taipei (TW); Jeng-Nan Lin, Taipei (TW); Chan-Ju Lin, Taipei (TW); Jie-Ting Hsieh, Taipei (TW); Tsuan-Fang Lin, Taipei (TW); Yi-Ting Lyu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 82 days.

(21) Appl. No.: 17/541,275

(22) Filed: Dec. 3, 2021

(65) Prior Publication Data

US 2022/0214828 A1 Jul. 7, 2022

(30) Foreign Application Priority Data

Jan. 4, 2021 (TW) ................................ 110100107

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0679; G06F 3/0604
See application file for complete search history.

(56) References Cited

U.S. PATENT DOCUMENTS

| 8,862,807 | B2 | 10/2014 | Yoon et al. |
| 11,449,267 | B1* | 9/2022 | Rehmeyer ............. G06F 3/0616 |
| 2017/0249091 | A1* | 8/2017 | Hodes .................... G06F 1/3296 |
| 2021/0216216 | A1* | 7/2021 | Brandt ................ G06F 11/1048 |
| 2021/0303211 | A1* | 9/2021 | Moon .................... G06F 3/0679 |

FOREIGN PATENT DOCUMENTS

| CN | 109446019 | 3/2019 |
| TW | I396974 | 5/2013 |

* cited by examiner

*Primary Examiner* — Mark A Giardino, Jr.
(74) *Attorney, Agent, or Firm* — JCIPRNET (57) ABSTRACT

A storage device management method for a storage device is provided. The method includes periodically obtaining a current device temperature corresponding to the storage device via a temperature sensor of the storage device; accumulating a first count value in response to determining that the current device temperature is greater than a first temperature threshold; adjusting the first temperature threshold in response to determining that the first count value is greater than the first count threshold; accumulating a second count value in response to determining that the current device temperature is greater than a second temperature threshold; adjusting the second temperature threshold in response to determining that the second count value is greater than the second count threshold; and controlling the storage device to enter a target system state in response to determining that the current device temperature is not less than a critical temperature threshold.

18 Claims, 7 Drawing Sheets

STORAGE DEVICE AND STORAGE DEVICE MANAGEMENT METHOD

CROSS-REFERENCE TO RELATED APPLICATION

This application claims the priority benefit of Taiwan application serial no. 110100107, filed on Jan. 4, 2021. The entirety of the above-mentioned patent application is hereby incorporated by reference herein and made a part of this specification.

BACKGROUND

Technical Field

The disclosure relates to a storage device, and in particular, relates to a storage device provided with a rewritable non-volatile memory module and a storage device management method for the storage device.

Description of Related Art

With the advancement of technology, storage devices gradually use rewritable non-volatile memory modules with high access speeds such as flash memory to store data. Nevertheless, this type of rewritable non-volatile memory modules may cause errors in the accessed data due to temperature increase of the devices.

Accordingly, how to prevent data errors caused by temperature increase from occurring in a storage device is an important issue.

SUMMARY

The disclosure provides a storage device and a storage device management method for the storage device capable of dynamically adjusting different temperature thresholds according to a current device temperature of the storage device, so as to actively control a temperature of the storage device via the adjusted the temperature thresholds.

An embodiment of the disclosure provides a storage device. The storage device includes a rewritable non-volatile memory module, a connection interface circuit, a temperature sensor, and a storage controller. The connection interface circuit is configured to be electrically connected to a host system. The temperature sensor is configured to detect a current device temperature corresponding to the storage device. The storage controller is electrically connected to the rewritable non-volatile memory module, the connection interface circuit, and the temperature sensor. In addition, the storage controller is configured to periodically obtain the current device temperature corresponding to the storage device via the temperature sensor. The storage controller is further configured to accumulate a first count value in response to determining that the current device temperature is greater than a first temperature threshold. The storage controller is further configured to determine whether the first count value is greater than a first count threshold. The storage controller is further configured to adjust the first temperature threshold in response to determining that the first count value is greater than the first count threshold. The storage controller is further configured to accumulate a second count value in response to determining that the current device temperature is greater than a second temperature threshold. Further, the storage controller is further configured to determine whether the second count value is greater than a second count threshold. The storage controller is further configured to adjust the second temperature threshold in response to determining that that the second count value is greater than the second count threshold. The storage controller is further configured to determine whether the current device temperature is greater than a critical temperature threshold. The storage controller is further configured to control the storage device to enter a target system state in response to determining that the current device temperature is not less than the critical temperature threshold.

An embodiment of the disclosure provides a storage device management method for a storage device. The method includes the following steps. A current device temperature corresponding to a storage device is periodically obtained via a temperature sensor of the storage device. A first count value is accumulated in response to determining that the current device temperature is greater than a first temperature threshold. Whether the first count value is greater than a first count threshold is determined. The first temperature threshold is adjusted in response to determining that the first count value is greater than the first count threshold. A second count value is accumulated in response to determining that the current device temperature is greater than a second temperature threshold. Whether the second count value is greater than a second count threshold is determined. The second temperature threshold is adjusted in response to determining that the second count value is greater than the second count threshold. Whether the current device temperature is greater than a critical temperature threshold is determined. The storage device is controlled to enter a target system state in response to determining that the current device temperature is not less than the critical temperature threshold.

In an embodiment of the disclosure, the storage device management method further includes the following steps. The current device temperature is periodically obtained via the temperature sensor of the storage device in response to determining that the first count value is not greater than the first count threshold. The current device temperature is periodically obtained via the temperature sensor of the storage device in response to determining that the second count value is not greater than the second count threshold. The current device temperature is periodically obtained via the temperature sensor of the storage device in response to determining that the current device temperature is not greater than the critical temperature threshold.

In an embodiment of the disclosure, the step of adjusting the first temperature threshold includes the following step. A first adjustment mark is set. The first adjustment mark is configured to indicate that the first temperature threshold is adjusted. In addition, the step of adjusting the second temperature threshold includes the following step. A second adjustment mark is set. The second adjustment mark is configured to indicate that the second temperature threshold is adjusted.

In an embodiment of the disclosure, the target system state is a standby state or a sleep state.

In an embodiment of the disclosure, the step of adjusting the first temperature threshold further includes the following step. The first temperature threshold is adjusted to a first target value. The first target value is less than an original first default value corresponding to the first temperature threshold. The step of adjusting the second temperature threshold further includes the following step. The second temperature threshold is adjusted to a second target value by a storage controller. The second target value is less than an original second default value corresponding to the second temperature threshold.

In an embodiment of the disclosure, the storage device management method further includes the following steps. Whether the first temperature threshold and the second temperature threshold are adjusted is determined when the storage device enters a normal working state. The first temperature threshold is set to the first target value in response to determining that the first temperature threshold is adjusted. The second temperature threshold is set to the second target value in response to determining that the second temperature threshold is adjusted. The first temperature threshold is set to the first default value in response to determining that the first temperature threshold is not adjusted. The second temperature threshold is set to the second default value in response to determining that the second temperature threshold is not adjusted.

In an embodiment of the disclosure, the storage device management method further includes the following steps. Whether the current device temperature is greater than or equal to a restored temperature threshold and is less than the first target value set as the first temperature threshold is determined after the first temperature threshold is set to the first target value and the second temperature threshold is set to the second target value. A third count value is accumulated in response to determining that the current device temperature is greater than or equal to the restored temperature threshold and is less than the first target value set as the first temperature threshold. Whether the third count value is greater than a third count threshold is determined. The first temperature threshold is adjusted to a first restored value in response to determining that the third count value is greater than the third count threshold. Whether the current device temperature is not less than the first target value set as the first temperature threshold is determined in response to determining that the third count value is not greater than the third count threshold. The first temperature threshold is adjusted to the first restored value in response to determining that the current device temperature is less than the first target value set as the first temperature threshold. Whether the current device temperature is not less than the second target value set as the second temperature threshold is determined in response to determining that the current device temperature is not less than the first target value set as the first temperature threshold. A fourth count value is accumulated in response to determining that the current device temperature is not less than the second target value set as the second temperature threshold. Whether the fourth count value is greater than a fourth count threshold is determined. Further, the second temperature threshold is adjusted to a second restored value in response to determining that the fourth count value is greater than the fourth count threshold. The first restored value is greater than the first target value, and the second restored value is greater than the second target value.

In an embodiment of the disclosure, the storage device management method further includes the following steps. The storage device is controlled to be in a first suppression mode in response to determining that the current device temperature is greater than the first temperature threshold and less than the second temperature threshold. The storage device operates at first power in the first suppression mode. The storage device is controlled to be in a second suppression mode in response to determining that the current device temperature is greater than the second temperature threshold and less than the critical temperature threshold. The storage device operates at second power in the second suppression mode. Further, the storage device is controlled to be in a normal working state in response to determining that the current device temperature is not greater than the first temperature threshold. The storage device operates at normal power in the normal working state. The normal power is greater than the first power, and the first power is greater than the second power.

In an embodiment of the disclosure, the storage device management method further includes the following steps. The first count value is reset in response to determining that the current device temperature is not greater than the first temperature threshold. Further, the second count value is reset in response to determining that the current device temperature is not greater than the second temperature threshold.

To sum up, in the storage device and the storage device management method provided by the embodiments of the disclosure, in response to the temperature increase of the storage device, one or more corresponding temperature thresholds may be dynamically lowered. In this way, the storage device may lower the operation power of the storage device according to the adjusted one or more temperature thresholds. As such, the temperature increase of the storage device caused by operating may be actively suppressed, and data errors caused by excessively high temperature are prevented from occurring in the storage device. In this way, in the storage device and the storage device management method provided by the embodiments of the disclosure, reliability of the storage device and accuracy of the stored data may be effectively improved and increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In this embodiment, a storage device includes a rewritable non-volatile memory module and a storage device controller (also known as storage controller or storage control circuit). In addition, the storage device is usually used together with a host system so the host system may write data into or read data from the storage device.

Figure 1A:
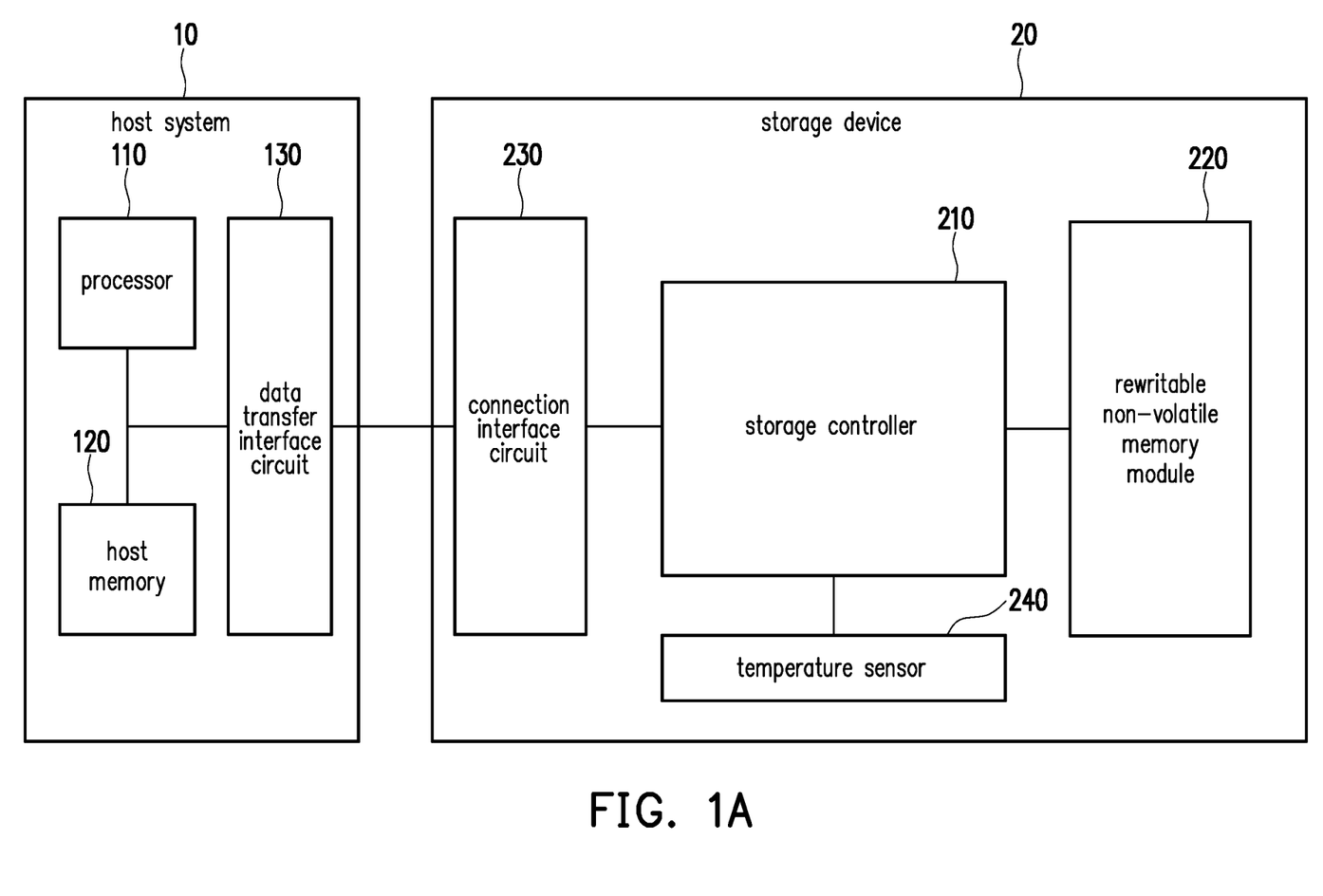
FIG. 1A is block schematic view illustrating a storage device and a host system according to an embodiment of the disclosure.
Figure 1B:
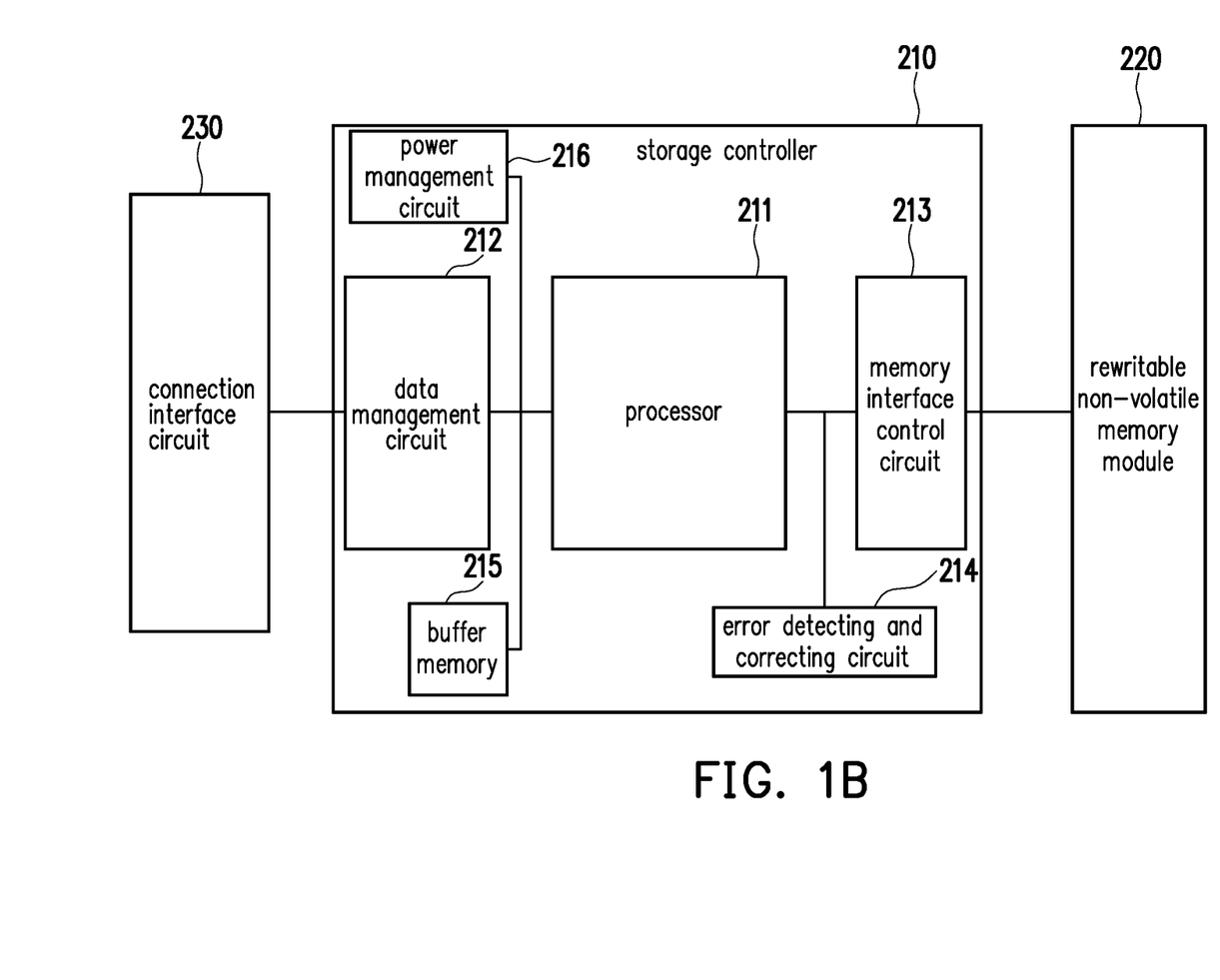
FIG. 1B is block schematic view illustrating a storage controller according to an embodiment of the disclosure.

FIG. 1A is block schematic view illustrating a storage device and a host system according to an embodiment of the disclosure. FIG. 1B is block schematic view illustrating a storage controller according to an embodiment of the disclosure.

With reference to FIG. 1, a host system 10 includes a processor 110, a host memory 120, and a data transfer interface circuit 130. In this embodiment, the data transfer interface circuit 130 is coupled to (or, electrically connected to) the processor 110 and the host memory 120. In another embodiment, the processor 110, the host memory 120, and the data transfer interface circuit 130 are coupled to one another by utilizing a system bus in another embodiment.

A storage device 20 includes a storage controller 210, a rewritable non-volatile memory module 220, a connection interface circuit 230, and a temperature sensor (thermal sensor) 240. Herein, the storage controller 210 includes a processor 211, a data management circuit 212, a memory interface control circuit 213, an error detecting and correcting circuit 214, a buffer memory 215, and a power management circuit 216. Note that operations performed by each of the components of the storage controller 210 may be treated as operations performed by the storage controller 210.

In this embodiment, the host system 10 is coupled to the storage device 20 through the data transfer interface circuit 130 and the connection interface circuit 230 of the storage device 20 to perform a data access operation. For instance, the host system 10 may store data to the storage device 20 or read data from the storage device 20 through the data transfer interface circuit 130.

In this embodiment, the processor 110, the host memory 120, and the data transfer interface circuit 130 may be disposed on a main board of the host system 10. A number of the data transfer interface circuit 130 may be one or more. The main board may be coupled to the storage device 20 in a wired manner or a wireless manner through the data transfer interface circuit 130. The storage device 20 may be, for example, a flash drive, a memory card, a solid state drive (SSD), or a wireless memory storage device.

In this embodiment, the data transfer interface circuit 130 and the connection interface circuit 230 are interface circuits compatible with a Peripheral Component Interconnect Express (PCI Express) interface standard. Further, data transfer is performed between the data transfer interface circuit 130 and the connection interface circuit 230 by using a communication protocol of a Non-Volatile Memory express (NVMe) interface standard.

Nevertheless, it should be understood that the invention is not limited thereto. The data transfer interface circuit 130 and the connection interface circuit 230 may also be compatible to a Parallel Advanced Technology Attachment (PATA) standard, an Institute of Electrical and Electronic Engineers (IEEE) 1394 standard, a Serial Advanced Technology Attachment (SATA) standard, a Universal Serial Bus (USB) standard, or other suitable standards.

In this embodiment, the host memory 120 is configured to temporarily store commands executed by the processor 110 or data. For instance, in this embodiment, the host memory 120 may be a dynamic random access memory (DRAM), a static random access memory (SRAM), and the like. Nevertheless, it should be understood that the disclosure is not limited thereto, and the host memory 120 may also be other suitable memories.

The storage controller 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading, and erasing data during operation of the storage device 20.

Note that in the present embodiment, each of the processor 110 and the processor 211 is, for example, a central processing unit (CPU), a micro-processor, or any other programmable processing unit, a digital signal processor (DSP), a programmable controller, a programmable logic device (PLD), or other similar circuit elements, which are not particularly limited by the disclosure.

In an embodiment, the storage controller 210 further includes a read-only memory (not shown) and a random access memory (not shown). In particular, the read-only memory has a boot code, which is executed by the processor 221 first to load the control commands/program codes/firmware stored in the rewritable non-volatile memory module 220 into the random access memory of the storage controller 210 when the storage controller 210 is enabled. Next, the control commands/program codes/firmware are executed by the processor 211 to perform data accessing operations, such as data writing, reading, or erasing, and management operations related to the storage device.

Herein, the data management circuit 212 is coupled to the processor 211, the memory interface control circuit 213, and the connection interface circuit 230. The data management circuit 212 is configured to receive an instruction of the processor 211 to transfer data. For instance, the data may be read from the host system 10 (e.g., the host memory 120) through the connection interface circuit 230, and the read data may be written into the rewritable non-volatile memory module 220 through the memory interface control circuit 213 (for instance, such write operation is performed according to a write command from the host system 10). As another example, the data may be read from one or a plurality of physical units of the rewritable non-volatile memory module 220 through the memory interface control circuit 213, and the read data may be written into the host system 10 (e.g., the host memory 120) through the connection interface circuit 230 (for instance, such read operation is performed according to a read command from the host system 10). In another embodiment, the data management circuit may also be integrated into the processor 211.

The memory interface control circuit 213 is configured to receive instruction of the processor 211 and perform a writing (or, programming), reading, or erasing operation on the rewritable non-volatile memory module 220 together with the data management circuit 212. In addition, data to be written to the rewritable non-volatile memory module 220 is converted into a format acceptable by the rewritable non-volatile memory module 220 through the memory interface control circuit 213.

The rewritable non-volatile memory module 220 is coupled to the storage controller 210 (the memory interface control circuit 213) and is configured to store data written by the host system 10. The rewritable non-volatile memory module 220 may be a single level cell (SLC) NAND flash memory module (i.e., a flash memory module capable of storing one bit in one memory cell), a multi level cell (MLC) NAND flash memory module (i.e., a flash memory module capable of storing two bits in one memory cell), a triple level cell (TLC) NAND flash memory module (i.e., a flash memory module capable of storing three bits in one memory cell), a quadruple level cell (QLC) NAND flash memory module (i.e., a flash memory module capable of storing four bits in one memory cell), a three-dimensional (3D) NAND flash memory module, a vertical NAND flash memory module, other flash memory modules, or any memory module having the same features. Memory cells in the rewritable non-volatile memory module 220 are arranged into an array.

In this embodiment, the rewritable non-volatile memory module 220 has a plurality of word lines, and each word line in the plurality of word lines is coupled to a plurality of memory cells. The memory cells on the same word line form one or a plurality of physical programming units. In addition, the physical programming units may form one physical unit (a physical block or a physical erasing unit).

In this embodiment, the error detecting and correcting circuit 214 is coupled to the processor 211 and is configured to execute an error detecting and correcting procedure to ensure correctness of data. To be specific, when the processor 211 receives a write command from the host system 10, the error detecting and correcting circuit 214 may generate a corresponding error correcting code (ECC) and/or an error detecting code (EDC) for data corresponding to the write command, and the processor 211 may write the data corresponding to the write command and the corresponding error correcting code and/or the error detecting code into the rewritable non-volatile memory module 220. Next, when reading the data from the rewritable non-volatile memory module 220, the processor 211 may read the error correcting code and/or the error detecting code corresponding to the data at the same time, and the error detecting and correcting circuit 214 may execute the error detecting and correcting procedure for the read data according to the error correcting code and/or the error detecting code. In addition, after the error detecting and correcting procedure is completed, if the read data is successfully decoded, the error detecting and correcting circuit 214 may obtain a plurality of error bits corresponding to a plurality of physical pages. The error detecting and correcting circuit 214 may return the error bits corresponding to the physical pages to the processor 211.

In an embodiment, the storage controller 210 further includes a buffer memory 215 and a power management circuit 216. The buffer memory 215 (e.g., a dynamic random access memory) is coupled to the processor 211 and is configured to temporarily store data and commands from the host system 10, data from the rewritable non-volatile memory module 220, or other system data configured for managing the storage device 20. In this way, the processor 211 may rapidly access the data, commands, or system data from the buffer memory 215. The power management circuit 216 is coupled to the processor 211 and is configured to provide and manage power of the storage device 20.

In this embodiment, the temperature sensor 240 is configured to detect temperature information (i.e., device temperature) of the storage device 20. The temperature information includes: (1) temperature of the entire storage device 20, (2) temperature of the rewritable non-volatile memory module 220, and (3) temperature of the storage controller 210. The temperature sensor 240 may transmit the currently-detected temperature to the processor 211.

A storage device and a storage device management method for the storage device provided by the embodiments of the disclosure are described in detail below together with a plurality of drawings.

Figure 2:
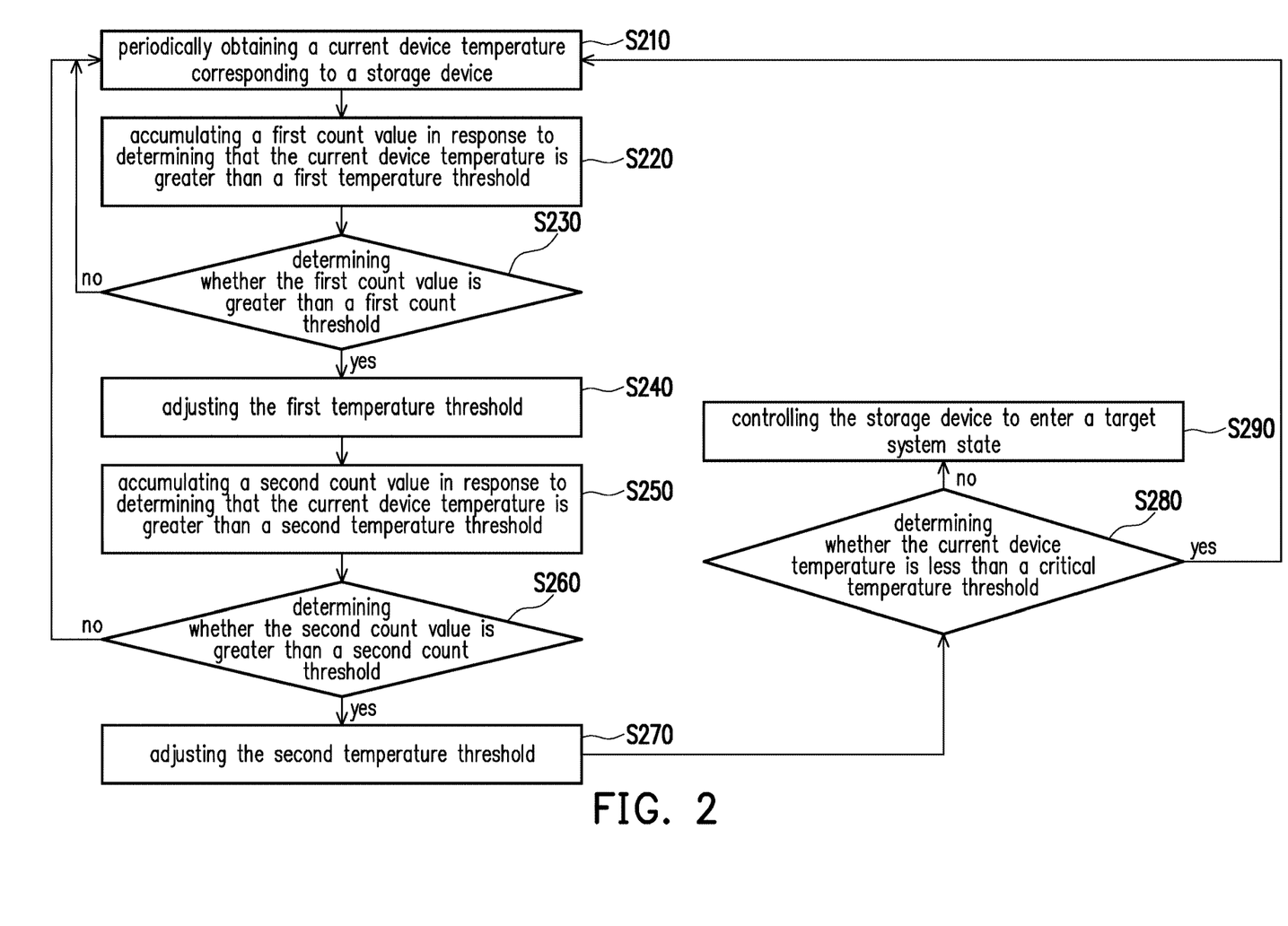
FIG. 2 is a flow chart illustrating a storage device management method according to an embodiment of the disclosure.

FIG. 2 is a flow chart illustrating a storage device management method according to an embodiment of the disclosure. With reference to FIG. 2, in step S210, the processor 211 periodically obtains a current device temperature corresponding to the storage device 20. To be specific, as described above, the storage controller 210 (e.g., processor 211) may periodically obtain the current temperature of the device (i.e., current device temperature) of the storage device 20 from the temperature sensor 240. Note that the duration of the period of obtaining the device temperature is not limited by the disclosure.

Next, in step S220, the storage controller 210 accumulates a first count value in response to determining that the current device temperature is greater than a first temperature threshold. To be specific, the storage controller 210 may determine whether the obtained current device temperature is greater than the first temperature threshold. The first temperature threshold is initially set to a first default value (i.e., 75 degrees Celsius). In an embodiment, the storage controller 210 resets the first count value in response to determining that the current device temperature is not greater than the first temperature threshold. That is, the first count value is configured to indicate the number of times of a plurality of consecutively-obtained current device temperatures exceeding the first temperature threshold.

Next, in step S230, the storage controller 210 determines whether the first count value is greater than a first count threshold. Step S240 is performed in response to determining that the first count value is greater than the first count threshold. Step S210 is performed again (i.e., to obtain the current device temperature of a next period) in response to determining that the first count value is not greater than the first count threshold.

In step S240, the storage controller 210 adjusts the first temperature threshold. To be specific, the storage controller 210 adjusts the first temperature threshold to a first target value. The first target value is less than an original first default value corresponding to the first temperature threshold. For instance, the first target value may be set to a value of 1 degree (Celsius) less than the first default value. In addition, in an embodiment, the storage controller 210 is further provided with a first adjustment mark in the operation of adjusting the first temperature threshold. The first adjustment mark is configured to indicate that the first temperature threshold is adjusted.

Next, in step S250, the storage controller 210 accumulates a second count value in response to determining that the current device temperature is greater than a second temperature threshold. To be specific, the storage controller 210 may determine whether the obtained current device temperature is greater than the second temperature threshold. The second temperature threshold is initially set to a second default value. In an embodiment, the storage controller 210 resets the second count value in response to determining that the current device temperature is not greater than the second temperature threshold. That is, the second count value is configured to indicate the number of times of a plurality of consecutively-obtained current device temperatures exceeding the second temperature threshold.

Next, in step S260, the storage controller 210 determines whether the second count value is greater than a second count threshold. Step S270 is performed in response to determining that the second count value is greater than the second count threshold. Step S210 is performed again (i.e., to obtain the current device temperature of the next period) in response to determining that the second count value is not greater than the second count threshold.

In step S270, the storage controller 210 adjusts the second temperature threshold. To be specific, the storage controller 210 adjusts the second temperature threshold to a second target value. The second target value is less than the original second default value (i.e., 78 degrees Celsius) corresponding to the second temperature threshold. For instance, the second target value may be set to a value of 1 degree (Celsius) less than the second default value. In addition, in an embodiment, the storage controller 210 is further provided with a second adjustment mark in the operation of adjusting the second temperature threshold. The second adjustment mark is configured to indicate that the second temperature threshold is adjusted.

Next, in step S280, the storage controller 200 determines whether the current device temperature is less than a critical temperature threshold.

To be specific, the critical temperature threshold is configured to protect data stored in the storage device from errors caused by high temperature. The critical temperature threshold is a pre-set value (e.g., 85 degrees Celsius) corresponding to a physical property of the rewritable non-volatile memory module 220 (i.e., a capacity of a memory cell in the rewritable non-volatile memory module 220 to store charges is to be weakened due to a specific high temperature).

Step S290 is performed in response to determining that the current device temperature is not less than the critical temperature threshold. Step S210 is performed again (i.e., to obtain the current device temperature of the next period) in response to determining that the current device temperature is less than the critical temperature threshold.

In step S290, the storage controller 210 controls the storage device 20 to enter a target system state. The target system state is a standby state or a sleep state. such as the S3 (suspend to RAM) system state in a plurality of global system states in the advanced configuration and power interface (ACPI) specification.

Note that the storage device management method provided above focuses on the manners and conditions to dynamically set the first temperature threshold and the second temperature threshold. The first temperature threshold and the second temperature threshold used by the storage device whose temperature rises frequently may be dynamically adjusted.

In this embodiment, the storage controller 210 may, according to the obtained current device temperature, the first temperature threshold, and the second temperature threshold, manage overall efficiency/power of the storage device 20 to control the temperature of the storage device 20. Description is provided hereinafter with reference to FIG. 3.

Figure 3:
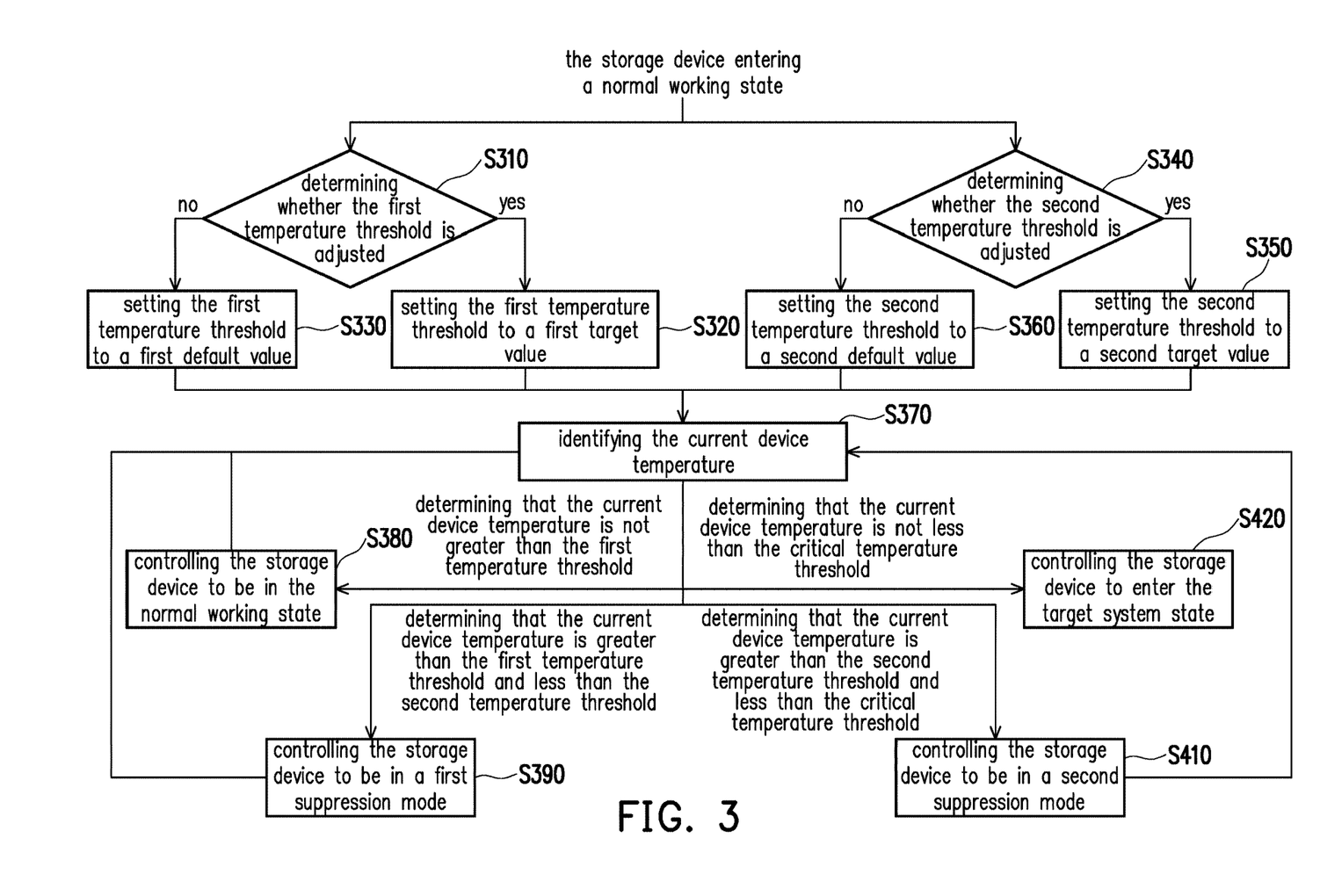
FIG. 3 is a flow chart illustrating a storage device management method according to another embodiment of the disclosure.

FIG. 3 is a flow chart illustrating a storage device management method according to another embodiment of the disclosure. After the storage device 20 enters a normal working state, the storage controller 210 may determine whether the first temperature threshold (e.g., step S310) and the second temperature threshold (e.g., step S340) are adjusted to perform corresponding processing procedures.

To be more specific, in step S310, the storage controller 210 determines whether the first temperature threshold is adjusted. Step S320 is performed in response to determining that the first temperature threshold is adjusted. Step S330 is performed in response to determining that the first temperature threshold is not adjusted. In step S330, the storage controller 210 sets the first temperature threshold to the first default value. In step S320, the storage controller 210 sets the first temperature threshold to the first target value.

For instance, in an embodiment, the storage controller 210 may determine whether the first temperature threshold is adjusted according to whether the first adjustment mark is recorded as a first value (e.g., a true value or 1). For instance, when the storage controller 210 identifies that the first adjustment mark is set from "0" to "1", the storage controller 210 may determine that the first temperature threshold is adjusted and executes step S320.

Further, in step S340, the storage controller 210 determines whether the second temperature threshold is adjusted. Step S350 is performed in response to determining that the second temperature threshold is adjusted. Step S360 is performed in response to determining that the second temperature threshold is not adjusted. In step S360, the storage controller 210 sets the second temperature threshold to the second default value. In step S350, the storage controller 210 sets the second temperature threshold to the second target value.

In an embodiment, the storage controller 210 may determine whether the second temperature threshold is adjusted according to whether the second adjustment mark is recorded as the first value (e.g., a true value or 1). For instance, when the storage controller 210 identifies that the second adjustment mark is set from "0" to "1", the storage controller 210 may determine that the second temperature threshold is adjusted and executes step S350.

Note that manners to set the first adjustment mark and the second adjustment mark are not limited by the disclosure. For instance, in another embodiment, the storage controller 210 may simultaneously identify whether the first temperature threshold and the second temperature threshold are adjusted by using a single mark (e.g., a two-bit value).

Next, in step S370, the storage controller 210 identifies the current device temperature. To be specific, the storage controller 210 may identify the latest obtained current device temperature from the temperature sensor 240. Further, the storage controller 210 may compare the identified current device temperature with the first temperature threshold, the second temperature threshold, and the critical temperature threshold.

To be more specific, the storage controller 210 executes step S380 in response to determining that the current device temperature is not greater than the first temperature threshold. The storage controller 210 executes step S390 in response to determining that the current device temperature is greater than the first temperature threshold and is less than the second temperature threshold. The storage controller 210 executes step S410 in response to determining that the current device temperature is greater than the second temperature threshold and is less than the critical temperature threshold. The storage controller 210 executes step S420 in response to determining that the current device temperature is not less than the critical temperature threshold.

In step S380, the storage controller 210 controls the storage device 20 to be in the normal working state. In the normal working state, the storage device 20 operates at normal power. For instance, the storage device 20 is controlled to operate at 100% power and efficiency.

In step S390, the storage controller 210 controls the storage device 20 to be in a first suppression mode. For instance, the storage device 20 is controlled to operate at 50% power and efficiency.

In step S410, the storage controller 210 controls the storage device 20 to be in a second suppression mode. In the second suppression mode, the storage device 20 operates at second power. For instance, the storage device 20 is controlled to operate at 5% power and efficiency.

In step S420, the storage controller 210 controls the storage device 20 to enter the target system state.

Note that steps S310 to S360 may be omitted in the disclosure. For instance, in another embodiment, the storage controller 210 may record the adjusted first temperature threshold and the second temperature threshold in firmware. When the storage device 20 enters the normal working state, the storage controller 210 may directly read the recorded adjusted first temperature threshold and the adjusted second temperature threshold, so as to set the first temperature threshold and the second temperature threshold to be currently used.

Figure 4A:
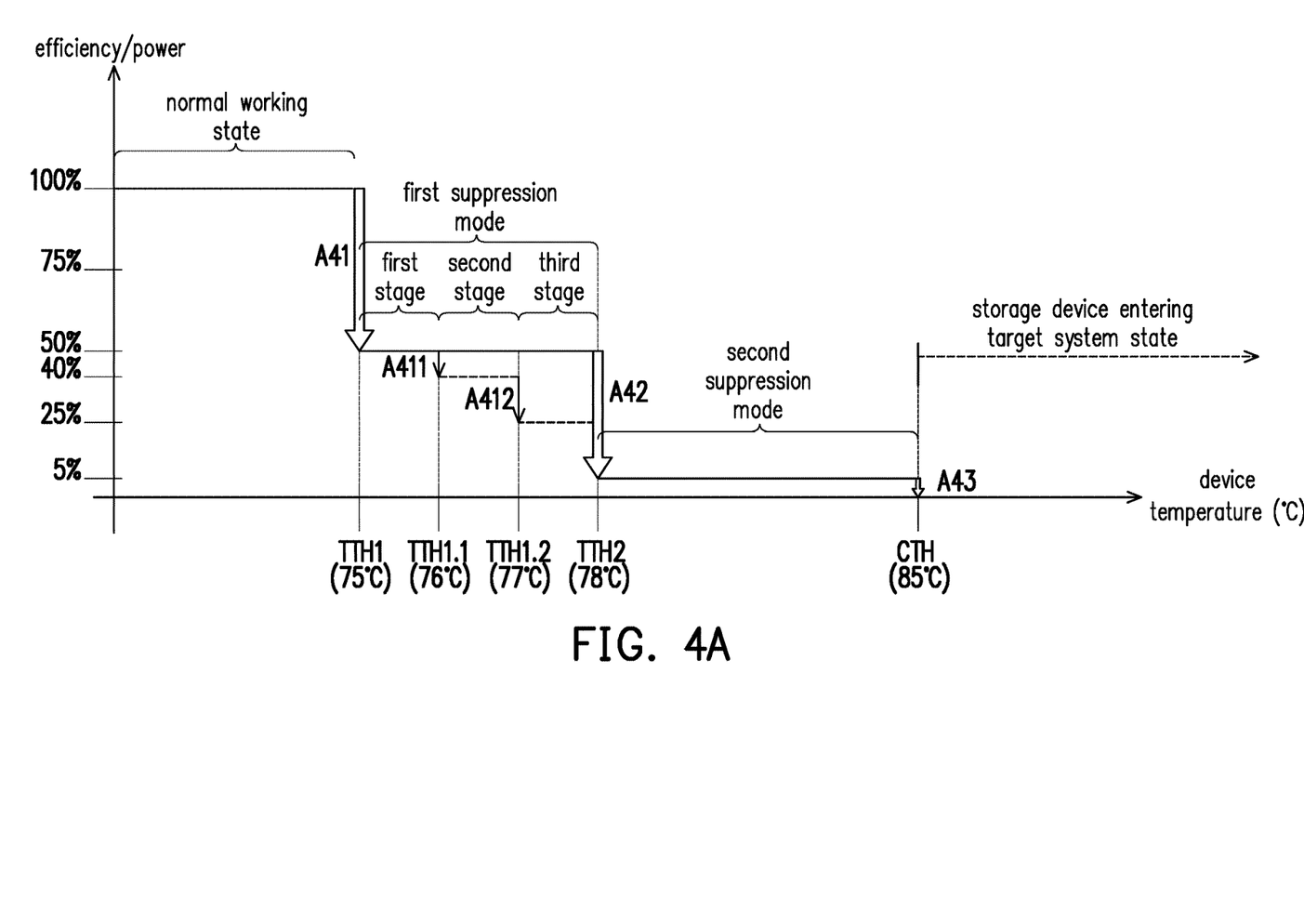
FIG. 4A is a schematic chart illustrating management of efficiency/power of the storage device according to temperature thresholds according to an embodiment of the disclosure.

FIG. 4A is a schematic chart illustrating management of efficiency/power of the storage device according to temperature thresholds according to an embodiment of the disclosure. With reference to FIG. 4A, for instance, it is assumed that the first default value corresponding to a first temperature threshold TTH1 is 75 degrees Celsius, the second default value corresponding to a second temperature threshold TTH2 is 78 degrees Celsius, and a critical temperature threshold CTH is preset to be 85 degrees Celsius. As shown in FIG. 4A, the storage controller 210 controls the storage device 20 to be in the normal working state in response to determining that the current device temperature is not greater than the first temperature threshold TTH1. That is, the storage device 20 operates at 100% efficiency/power. The normal working state may also be referred to as the G0 or S0 state in the ACPI specification.

The storage controller 210 controls the storage device 20 to be in the first suppression mode in response to determining that the current device temperature is greater than the first temperature threshold TTH1 and is not greater than the second temperature threshold TTH2, as shown by arrow A41. That is, the storage device 20 operates at 50% efficiency/power.

The storage controller 210 controls the storage device 20 to be in the second suppression mode in response to determining that the current device temperature is greater than the second temperature threshold TTH2 and is less than the critical temperature threshold CTH, as shown by arrow A42. That is, the storage device 20 operates at 5% efficiency/power.

The storage controller 210 controls the storage device 20 to be in the target system state in response to determining that the current device temperature is not less than the critical temperature threshold CTH as shown by arrow A43. That is, the storage device 20 enters the standby mode or the sleep mode.

In an embodiment, the first suppression mode may be further divided into a first stage, a second stage, and a third stage according to the current device temperature. For instance, the storage controller 210 controls the storage device 20 to be in the first stage in the first suppression mode in response to determining that the current device temperature is greater than the first temperature threshold TTH1 and is not greater than a first stage temperature threshold TTH1.1, as shown by arrow A41. That is, the storage device 20 operates at 50% efficiency/power. The storage controller 210 controls the storage device 20 to be in the second stage in the first suppression mode in response to determining that the current device temperature is greater than the first stage temperature threshold TTH1.1 and is not greater than a second stage temperature threshold TTH1.2, as shown by arrow A411. That is, the storage device 20 operates at 40% efficiency/power. The storage controller 210 controls the storage device 20 to be in the third stage in the first suppression mode in response to determining that the current device temperature is greater than the second stage temperature threshold TTH1.2 and is not greater than the second temperature threshold TTH2, as shown by arrow A412. That is, the storage device 20 operates at 25% efficiency/power. Note that the first stage temperature threshold TTH1.1 and the second stage temperature threshold TTH1.2 may also be adjusted to an adjusted first stage temperature threshold TTH1.1' and an adjusted second stage temperature threshold TTH1.2' through a manner similar to that of adjusting the first temperature threshold and the second temperature threshold.

Figure 4B:
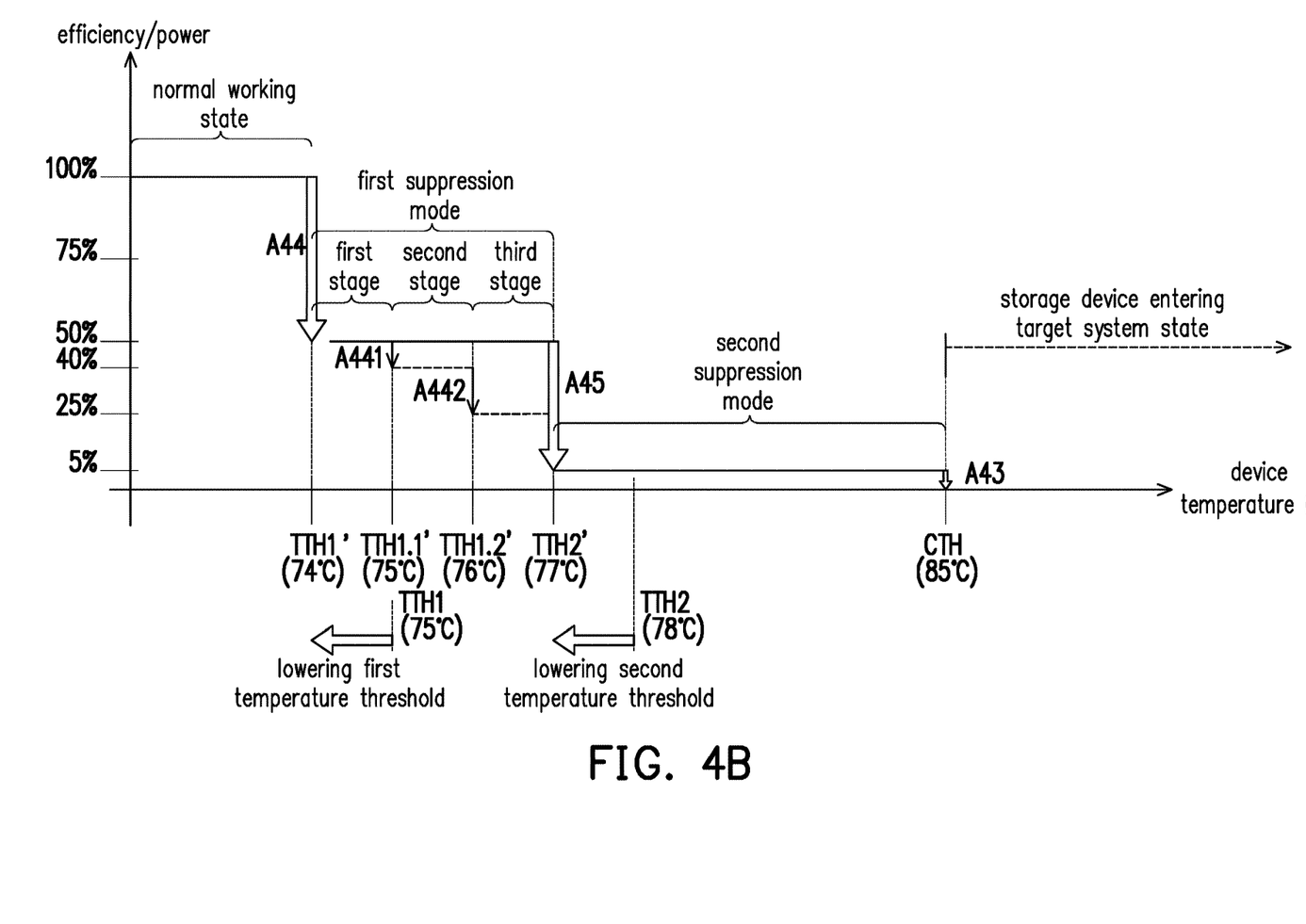
FIG. 4B is a schematic chart illustrating management of efficiency/power of the storage device according to temperature thresholds according to an embodiment of the disclosure.

FIG. 4B is a schematic chart illustrating management of efficiency/power of the storage device according to temperature thresholds according to an embodiment of the disclosure. Similar to the embodiment of FIG. 4A, in this embodiment, the storage controller 210 determines that the first temperature threshold TTH1 is adjusted and the second temperature threshold TTH2 is adjusted. Based on the above, the storage controller 210 sets the first temperature threshold TTH1 to a first target value TTH1' (adjusted first temperature threshold) and sets the second temperature threshold TTH2 to a second target value TTH2' (adjusted second temperature threshold). Next, the storage controller 210 may compare the obtained current device temperature with the adjusted first temperature threshold TTH1', the adjusted second temperature threshold TTH2', and the critical temperature threshold CTH to control the efficiency/power of the storage device 20.

For instance, the storage controller 210 controls the storage device 20 to be in the normal working state in response to determining that the current device temperature is not greater than the adjusted first temperature threshold TTH1'. That is, the storage device 20 operates at 100% efficiency/power.

The storage controller 210 controls the storage device 20 to be in the first suppression mode in response to determining that the current device temperature is greater than the adjusted first temperature threshold TTH1' and is not greater than the adjusted second temperature threshold TTH2', as shown by arrow A44. That is, the storage device 20 operates at 50% efficiency/power.

The storage controller 210 controls the storage device 20 to be in the second suppression mode in response to determining that the current device temperature is greater than the adjusted second temperature threshold TTH2' and is less than the critical temperature threshold CTH, as shown by arrow A45. That is, the storage device 20 operates at 5% efficiency/power.

The storage controller 210 controls the storage device 20 to be in the target system state in response to determining that the current device temperature is not less than the critical temperature threshold CTH as shown by arrow A43. That is, the storage device 20 enters the standby mode or the sleep mode.

In addition, in an embodiment, the storage controller 210 controls the storage device 20 to be in the first stage in the first suppression mode in response to determining that the current device temperature is greater than the adjusted first temperature threshold TTH1' and is not greater than adjusted first stage temperature threshold TTH1.1', as shown by arrow A441. That is, the storage device 20 operates at 50% efficiency/power. The storage controller 210 controls the storage device 20 to be in the second stage in the first suppression mode in response to determining that the current device temperature is greater than the adjusted first stage temperature threshold TTH1.1' and is not greater than the second stage temperature threshold TTH1.2, as shown by arrow A411. That is, the storage device 20 operates at 40% efficiency/power. The storage controller 210 controls the storage device 20 to be in the third stage in the first suppression mode in response to determining that the current device temperature is greater than the adjusted second stage temperature threshold TTH1.2' and is not greater than the adjusted second temperature threshold TTH2, as shown by arrow A442. That is, the storage device 20 operates at 25% efficiency/power.

Note that the specific numerical values of the plural temperature thresholds are exemplary only and are not intended to be used to limit the disclosure.

Figure 5:
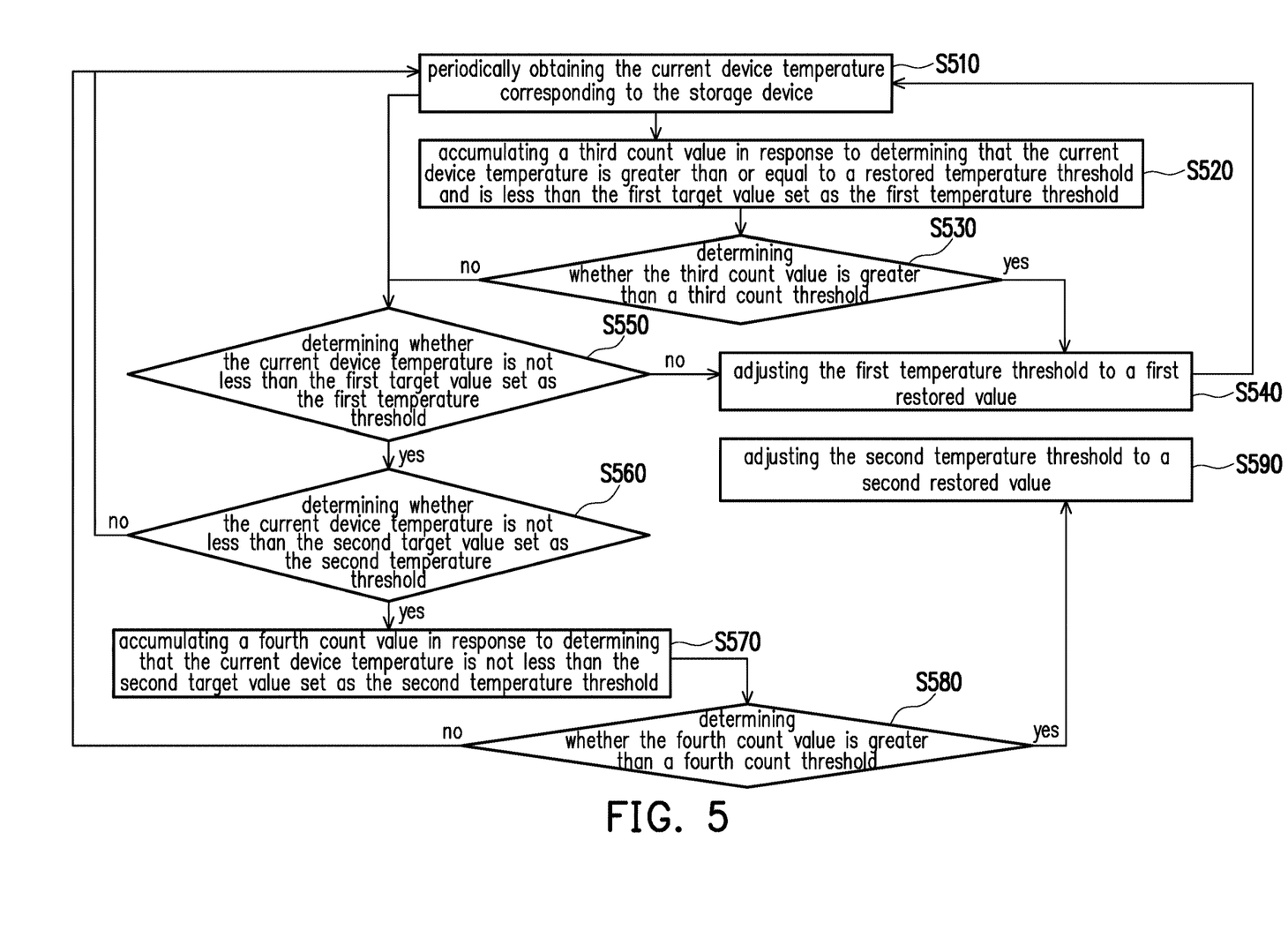
FIG. 5 is a flow chart illustrating of a storage device management method for restoring an adjusted temperature threshold according to an embodiment of the disclosure.

FIG. 5 is a flow chart illustrating of a storage device management method for restoring an adjusted temperature threshold according to an embodiment of the disclosure.

Note that in an embodiment of the disclosure, the storage controller 210 is further configured to execute a restoration mechanism to respectively restore the adjusted first temperature threshold and the adjusted second temperature threshold to the first default value and the second default value after the storage device 20 enters the normal working state or the first suppression mode for a stable period of time. To be specific, with reference to FIG. 5, in step S510, the storage controller 210 may periodically obtain the current device temperature corresponding to the storage device 20 from the temperature sensor 240.

Next, in step S520, the storage controller 210 accumulates a third count value in response to determining that the current device temperature is greater than or equal to a restored temperature threshold and is less than the first target value set as the first temperature threshold. Herein, the restored temperature threshold is, for example, 70 degrees Celsius, and the first target value set as the first temperature threshold is set to a value of, for example, 1 degree (Celsius) less than the first default value (e.g., 75 degrees Celsius), that is, 74 degrees Celsius, in the foregoing embodiments. In an embodiment, the storage controller 210 may reset the third count value in response to determining that the current device temperature is less than the restored temperature threshold or is greater than the first target value set as the first temperature threshold. That is, the third count value is configured to indicate the number of times of a plurality of consecutively-obtained current device temperatures between the restored temperature threshold and the first target value.

Next, in step S530, the storage controller 210 determines whether the third count value is greater than a third count threshold, and in this example, the third count threshold is, for example, 20. Step S540 is performed in response to determining that the third count value is greater than the third count threshold. That is, when the number of times of the obtained current device temperatures between the restored temperature threshold and the first target value reaches the third count threshold, it may be determined that the storage device 20 enters the normal working state for a stable period of time. As such, step S540 configured to restore the first temperature threshold to the first default value may be performed. The current device temperature may be obtained again and step S550 may be performed again in response to determining that the third count value is not greater than the third count threshold.

In step S540, the storage controller 210 adjusts the first temperature threshold to a first restored value, and the first restored value is greater than the adjusted first temperature threshold (i.e., the first target value, e.g., 74 degrees Celsius). For instance, the first restored value may be set to be a value of 1 degree (Celsius) greater than the adjusted first temperature threshold. That is, in this example, the storage controller 210 may adjust the first temperature threshold to the first restored value of 75 degrees Celsius. In other words, the first temperature threshold may be restored to the initially-set first default value (i.e., 75 degrees Celsius).

In step S550, the storage controller 210 may obtain the current device temperature again and determines whether the current device temperature is not less than the first target value set as the first temperature threshold. Step S560 is performed in response to determining that the current device temperature is not less than the first target value set as the first temperature threshold. Step S540 configured to restore the first temperature threshold to the first default value is performed in response to determining that the first count value is less than the first target value set as the first temperature threshold. Description of step S540 is provided in previous paragraphs and is not repeated herein.

In step S560, the storage controller 210 may obtain the current device temperature again and determines whether the current device temperature is not less than the second target value set as the second temperature threshold. Step S510 is performed again (i.e., to obtain the current device temperature of the next period) in response to determining that the current device temperature is not less than the second target value set as the second temperature threshold. Step S570 is performed in response to determining that the current device temperature is less than the second target value set as the second temperature threshold. Herein, the second target value set as the second temperature threshold is set to a value of, for example, 1 degree (Celsius) less than the second default value (e.g., 78 degrees Celsius), that is, 77 degrees Celsius, in the foregoing embodiments.

Next, in step S570, the storage controller 210 accumulates a fourth count value in response to determining that the current device temperature is not less than the second target value set as the second temperature threshold. In an embodiment, the storage controller 210 may reset the fourth count value in response to determining that the current device temperature is less than the second target value set as the second temperature threshold. That is, the fourth count value is configured to indicate the number of times of a plurality of consecutively-obtained current device temperatures less than the second target value set as the second temperature threshold.

Next, in step S580, the storage controller 210 determines whether the fourth count value is greater than a fourth count threshold, and in this example, the fourth count threshold is, for example, 300. Step S590 is performed in response to determining that the fourth count value is greater than the fourth count threshold. That is, when the obtained current device temperatures are less than the second target value set as the second temperature threshold, it may be determined that the storage device 20 enters the first suppression mode for a stable period of time. As such, step S590 configured to restore the second temperature threshold to the second default value may be performed. In contrast, step S510 is performed again (i.e., to obtain the current device temperature of the next period) in response to determining that the fourth count value is not greater than the fourth count threshold.

In step S590, the storage controller 210 adjusts the second temperature threshold to a second restored value, and the second restored value is greater than the adjusted second temperature threshold (i.e., the second target value, e.g., 77 degrees Celsius). For instance, the second restored value is set to be a value of 1 degree (Celsius) greater than the adjusted second temperature threshold. That is, in this example, the storage controller 210 may adjust the second temperature threshold to the second restored value of 78 degrees Celsius. In other words, the second temperature threshold may be restored to the initially-set second default value (i.e., 78 degrees Celsius).

In view of the foregoing, in the storage device and the storage device management method provided by the embodiments of the disclosure, in response to the temperature increase of the storage device, one or more corresponding temperature thresholds may be dynamically lowered. In this way, the storage device may lower the operation power of the storage device according to the adjusted one or more temperature thresholds. As such, the temperature increase of the storage device caused by operating may be actively suppressed, and data errors caused by excessively high temperature are prevented from occurring in the storage device. Further, a restoration mechanism is provided by the embodiments of the disclosure to restore the adjusted one or more temperature thresholds when the temperature of the storage device is stable, and operation efficiency of the storage device is thereby maintained. In this way, in the storage device and the storage device management method provided by the embodiments of the disclosure, reliability of the storage device and accuracy of the stored data may be effectively improved and increased, and further, overall operation efficiency of the storage device is enhanced as well.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A storage device, comprising:
a rewritable non-volatile memory module;
a connection interface circuit, configured to be electrically connected to a host system;
a temperature sensor, configured to detect a current device temperature corresponding to the storage device; and
a storage controller, electrically connected to the rewritable non-volatile memory module, the connection interface circuit, and the temperature sensor, wherein
the storage controller is configured to periodically obtain the current device temperature corresponding to the storage device via the temperature sensor,
wherein the storage controller is further configured to accumulate a first count value in response to determining that the current device temperature is greater than a first temperature threshold,
wherein the storage controller is further configured to determine whether the first count value is greater than a first count threshold,
wherein the storage controller is further configured to adjust the first temperature threshold in response to determining that that the first count value is greater than the first count threshold,
wherein the storage controller is further configured to accumulate a second count value in response to determining that the current device temperature is greater than a second temperature threshold,
wherein the storage controller is further configured to determine whether the second count value is greater than a second count threshold,
wherein the storage controller is further configured to adjust the second temperature threshold in response to determining that that the second count value is greater than the second count threshold,
wherein the storage controller is further configured to determine whether the current device temperature is greater than a critical temperature threshold,
wherein the storage controller is further configured to control the storage device to enter a target system state in response to determining that the current device temperature is not less than the critical temperature threshold.

2. The storage device according to claim 1, wherein the storage controller continuously executes the operation of periodically obtaining the current device temperature via the temperature sensor in response to determining that the first count value is not greater than the first count threshold,
wherein the storage controller continuously executes the operation of periodically obtaining the current device temperature via the temperature sensor in response to determining that the second count value is not greater than the second count threshold,
wherein the storage controller continuously executes the operation of periodically obtaining the current device temperature via the temperature sensor in response to determining that the current device temperature is not greater than the critical temperature threshold.

3. The storage device according to claim 1, wherein
the storage controller is further provided with a first adjustment mark in the operation of adjusting the first temperature threshold, wherein the first adjustment mark is configured to indicate that the first temperature threshold is adjusted,
the storage controller is further provided with a second adjustment mark in the operation of adjusting the second temperature threshold, wherein the second adjustment mark is configured to indicate that the second temperature threshold is adjusted.

4. The storage device according to claim 1, wherein the target system state is a standby state or a sleep state.

5. The storage device according to claim 1, wherein in the operation of adjusting the first temperature threshold,
the storage controller adjusts the first temperature threshold to a first target value, wherein the first target value is less than an original first default value corresponding to the first temperature threshold,
wherein in the operation of adjusting the second temperature threshold, the storage controller adjusts the second temperature threshold to a second target value, wherein the second target value is less than an original second default value corresponding to the second temperature threshold.

6. The storage device according to claim 5, wherein the storage controller determines whether the first temperature threshold and the second temperature threshold are adjusted when the storage device enters a normal working state,
wherein the storage controller sets the first temperature threshold to the first target value in response to determining that the first temperature threshold is adjusted, wherein the storage controller sets the second temperature threshold to the second target value in response to determining that the second temperature threshold is adjusted, wherein the storage controller sets the first temperature threshold to the first default value in response to determining that the first temperature threshold is not adjusted, wherein the storage controller sets the second temperature threshold to the second default value in response to determining that the second temperature threshold is not adjusted.

7. The storage device according to claim 6, wherein the storage controller is further configured to determine whether the current device temperature is greater than or equal to a restored temperature threshold and is less than the first target value set as the first temperature threshold after the storage controller sets the first temperature threshold to the first target value and sets the second temperature threshold to the second target value, wherein the storage controller is further configured to accumulate a third count value in response to determining that the current device temperature is greater than or equal to the restored temperature threshold and is less than the first target value set as the first temperature threshold, wherein the storage controller is further configured to determine whether the third count value is greater than a third count threshold, wherein the storage controller is further configured to adjust the first temperature threshold to a first restored value in response to determining that the third count value is greater than the third count threshold, wherein the storage controller is further configured to determine whether the current device temperature is not less than the first target value set as the first temperature threshold in response to determining that the third count value is not greater than the third count threshold, wherein the storage controller is further configured to adjust the first temperature threshold to the first restored value in response to determining that the current device temperature is less than the first target value set as the first temperature threshold, wherein the storage controller is further configured to determine whether the current device temperature is not less than the second target value set as the second temperature threshold in response to determining that the current device temperature is not less than the first target value set as the first temperature threshold, wherein the storage controller is further configured to accumulate a fourth count value in response to determining that the current device temperature is not less than the second target value set as the second temperature threshold, wherein the storage controller is further configured to determine whether the fourth count value is greater than a fourth count threshold, wherein the storage controller is further configured to adjust the second temperature threshold to a second restored value in response to determining that the fourth count value is greater than the fourth count threshold, wherein the first restored value is greater than the first target value, and the second restored value is greater than the second target value.

8. The storage device according to claim 1, wherein the storage controller controls the storage device to be in a first suppression mode in response to determining that the current device temperature is greater than the first temperature threshold and less than the second temperature threshold, wherein the storage device operates at first power in the first suppression mode, wherein the storage controller controls the storage device to be in a second suppression mode in response to determining that the current device temperature is greater than the second temperature threshold and less than the critical temperature threshold, wherein the storage device operates at second power in the second suppression mode, wherein the storage controller controls the storage device to be in a normal working state in response to determining that the current device temperature is not greater than the first temperature threshold, wherein the storage device operates at normal power in the normal working state, wherein the normal power is greater than the first power, and the first power is greater than the second power.

9. The storage device according to claim 1, wherein the storage controller resets the first count value in response to determining that the current device temperature is not greater than the first temperature threshold, and the storage controller resets the second count value in response to determining that the current device temperature is not greater than the second temperature threshold.

10. A storage device management method for a storage device, comprising:

periodically obtaining a current device temperature corresponding to the storage device via a temperature sensor of the storage device;

accumulating a first count value in response to determining that the current device temperature is greater than a first temperature threshold;

determining whether the first count value is greater than a first count threshold, adjusting the first temperature threshold in response to determining that the first count value is greater than the first count threshold;

accumulating a second count value in response to determining that the current device temperature is greater than a second temperature threshold;

determining whether the second count value is greater than a second count threshold, adjusting the second temperature threshold in response to determining that the second count value is greater than the second count threshold; and determining whether the current device temperature is greater than a critical temperature threshold, controlling the storage device to enter a target system state in response to determining that the current device temperature is not less than the critical temperature threshold.

11. The storage device management method according to claim 10, further comprising:

periodically obtaining the current device temperature via the temperature sensor of the storage device in response to determining that the first count value is not greater than the first count threshold;

periodically obtaining the current device temperature via the temperature sensor of the storage device in response to determining that the second count value is not greater than the second count threshold; and periodically obtaining the current device temperature via the temperature sensor of the storage device in response to determining that the current device temperature is not greater than the critical temperature threshold.

12. The storage device management method according to claim 10, wherein the step of adjusting the first temperature threshold comprises setting a first adjustment mark, wherein the first adjustment mark is configured to indicate that the first temperature threshold is adjusted, wherein the step of adjusting the second temperature threshold comprises setting a second adjustment mark, wherein the second adjustment mark is configured to indicate that the second temperature threshold is adjusted.

13. The storage device management method according to claim 10, wherein the target system state is a standby state or a sleep state.

14. The storage device management method according to claim 10, wherein the step of adjusting the first temperature threshold comprises:

adjusting the first temperature threshold to a first target value, wherein the first target value is less than an original first default value corresponding to the first temperature threshold, wherein the step of adjusting the second temperature threshold comprises:

adjusting the second temperature threshold to a second target value by a storage controller, wherein the second target value is less than an original second default value corresponding to the second temperature threshold.

15. The storage device management method according to claim 14, further comprising:

determining whether the first temperature threshold and the second temperature threshold are adjusted when the storage device enters a normal working state;

setting the first temperature threshold to the first target value in response to determining that the first temperature threshold is adjusted;

setting the second temperature threshold to the second target value in response to determining that the second temperature threshold is adjusted;

setting the first temperature threshold to the first default value in response to determining that the first temperature threshold is not adjusted; and setting the second temperature threshold to the second default value in response to determining that the second temperature threshold is not adjusted.

16. The storage device management method according to claim 15, further comprising:

determining whether the current device temperature is greater than or equal to a restored temperature threshold and is less than the first target value set as the first temperature threshold after the first temperature threshold is set to the first target value and the second temperature threshold is set to the second target value;

accumulating a third count value in response to determining that the current device temperature is greater than or equal to the restored temperature threshold and is less than the first target value set as the first temperature threshold;

determining whether the third count value is greater than a third count threshold;

adjusting the first temperature threshold to a first restored value in response to determining that the third count value is greater than the third count threshold;

determining whether the current device temperature is not less than the first target value set as the first temperature threshold in response to determining that the third count value is not greater than the third count threshold;

adjusting the first temperature threshold to the first restored value in response to determining that the current device temperature is less than the first target value set as the first temperature threshold;

determining whether the current device temperature is not less than the second target value set as the second temperature threshold in response to determining that the current device temperature is not less than the first target value set as the first temperature threshold;

accumulating a fourth count value in response to determining that the current device temperature is not less than the second target value set as the second temperature threshold;

determining whether the fourth count value is greater than a fourth count threshold; and adjusting the second temperature threshold to a second restored value in response to determining that the fourth count value is greater than the fourth count threshold, wherein the first restored value is greater than the first target value, and the second restored value is greater than the second target value.

17. The storage device management method according to claim 10, further comprising:

controlling the storage device to be in a first suppression mode in response to determining that the current device temperature is greater than the first temperature threshold and less than the second temperature threshold, wherein the storage device operates at first power in the first suppression mode; and controlling the storage device to be in a second suppression mode in response to determining that the current device temperature is greater than the second temperature threshold and less than the critical temperature threshold, wherein the storage device operates at second power in the second suppression mode; and controlling the storage device to be in a normal working state in response to determining that the current device temperature is not greater than the first temperature threshold, wherein the storage device operates at normal power in the normal working state, wherein the normal power is greater than the first power, and the first power is greater than the second power.

18. The storage device management method according to claim 10, further comprising:

resetting the first count value in response to determining that the current device temperature is not greater than the first temperature threshold; and resetting the second count value in response to determining that the current device temperature is not greater than the second temperature threshold.

* * * * *